United States Patent [19]

Applehans

[11] 4,023,836
[45] May 17, 1977

[54] SPLIT FLANGE RETAINER FOR FLANGED CONDUITS
[75] Inventor: Edward A. Applehans, Rockford, Ill.
[73] Assignee: The Gates Rubber Company, Denver, Colo.
[22] Filed: Dec. 15, 1975
[21] Appl. No.: 641,199
[52] U.S. Cl. .............................. 285/368; 285/174; 285/413
[51] Int. Cl.² .......................................... F16L 23/00
[58] Field of Search ............ 285/368, 413, 415, 174

[56] References Cited

UNITED STATES PATENTS

| 630,641 | 8/1899 | Albree | 285/413 |
|---|---|---|---|
| 961,987 | 6/1910 | Rust | 285/413 X |
| 2,911,239 | 11/1959 | Marzolf | 285/415 |
| 3,515,416 | 6/1970 | Pickert | 285/413 |
| 3,549,179 | 12/1970 | Cox | 285/368 X |
| 3,600,012 | 8/1971 | Stafford | 285/413 |
| 3,895,833 | 7/1975 | Thiessen | 285/413 |

FOREIGN PATENTS OR APPLICATIONS

| 343,725 | 2/1960 | Switzerland | 285/368 |

Primary Examiner—Thomas F. Callaghan
Attorney, Agent, or Firm—Curtis H. Castleman, Jr.; Raymond Fink; H. W. Oberg, Jr.

[57] ABSTRACT

A split flange retainer assembly adapted to engage the flanged head to a conduit for mounting the conduit to a bulkhead, for example for hydraulic applications, is described. A pair of the split flange retainers are adapted to interconnect about the flanged head of the conduit to simulate the operation of a solid flange while retaining the advantages of split flanges.

9 Claims, 4 Drawing Figures

SPLIT FLANGE RETAINER FOR FLANGED CONDUITS

BACKGROUND OF THE INVENTION

This invention relates to split flange couplings for mounting the flanged head of a conduit, such as an hydraulic hose fitting with an O-ring seal, to a bulkhead such as a pump, valve or cyclinder to which high pressure fluids are transmitted.

Flanged couplings of the above-described type are typically one of two varieties, a tow-bolt said solid flange retainer or a four-bolt split flange retainer. The solid flange has the advantage of continuous mechanical integrity about the flanged head of the conduit preventing tilting of the flange retainer so as to increase O-ring life, although they have the disadvantage that they must be permanently assembled with the conduit fitting and cannot be assembled or disassembled form the fitting after the fittings construction is complete. Because of these disadvantages, the split flange, which can be assemblied to the fitting after the fittings construction is otherwise complete, and which permits replacement or repair of parts, is the more flexible approach. Conventional split flanges, which are typified by SAE designation J518C, are made such that each half is independently held in place by two bolts to the bulkhead when in use, witout any mechanical overlap or interconnection between the flange halves. This permits a tilting action to take place about the centerline of the two bolts of each flange half, which in turn leads to blowout of the O-ring used for sealing the joints, and consequently requires continued maintenance and replacement of the O-rings.

Another common type of conduit connection is the direct threaded type (without a flange), however, this type is less versatile in use, and usually requires a swiveled connection which creates a weak point in the fluid transmitting system.

The present invention has as its primary object the provision of a split flange retainer which simulates a solid flange when in use by providing a well sealed joint free from the aforementioned tilting problem under design pressures.

SUMMARY OF THE INVENTION

In one aspect of the invention, a split flange retainer adapted to cooperatively engage the flanged head of a conduit for mounting the same to a bulkhead is disclosed, including (a) a body portion of a given thickness and having a curvilinear inner surface defined by adjacent upper and lower arcuate surfaces interconnected by a shoulder, the shoulder adapted to engage the flanged head of the conduit for mounting the same into the bulkhead; (b) a pair of legs attached to and extending from either end of the body portion of the flange retainer, of lesser thickness than the body portion and having respective inner arcuate surfaces extending from a portion of the curvilinear inner surface of the body portion; and (c) means for engaging fastener means facilitaing mounting the flanged head of the conduit.

In another aspect of the invention, a coupling assembly is disclosed including the split flange retainer defined above together with a conduit fitting which alternatively may be coupled to a hydraulic tubular element such as hydraulic hose.

BRIEF DESCRIPTION OF THE DRAWINGS

The invention in its preferred form will be described in reference to the accompanying drawings, wherein like numerals designate like parts, and wherein.

PREFERRED EMBODIMENTS OF THE INVENTION

Figure 2:
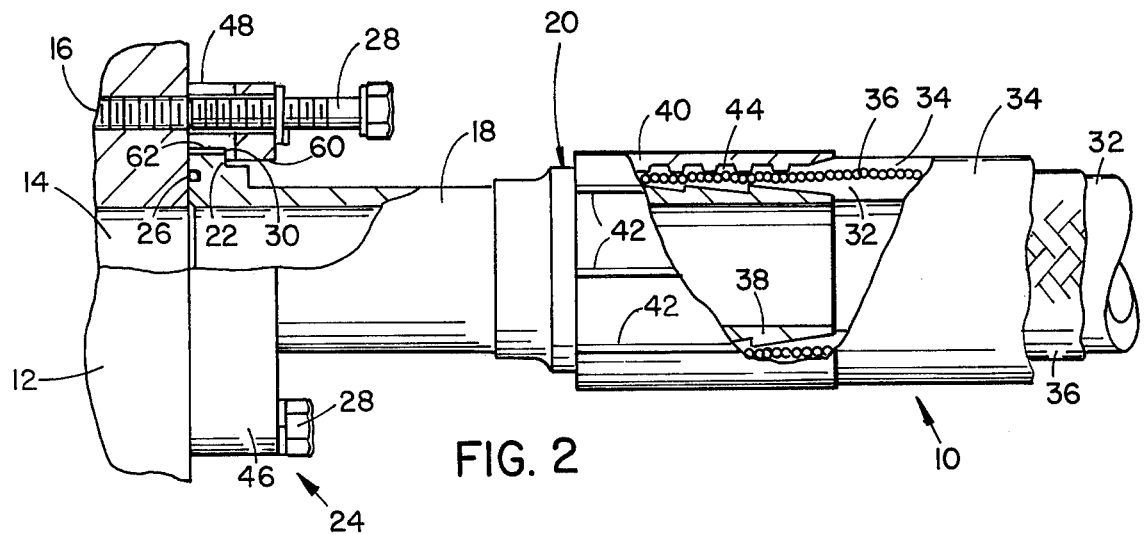
FIG. 2 is a partial sectional view taken along section 2—2 of FIG. 1, additionally showing in partial section an hydraulic hose coupled to the conduit fitting.
Figure 1:
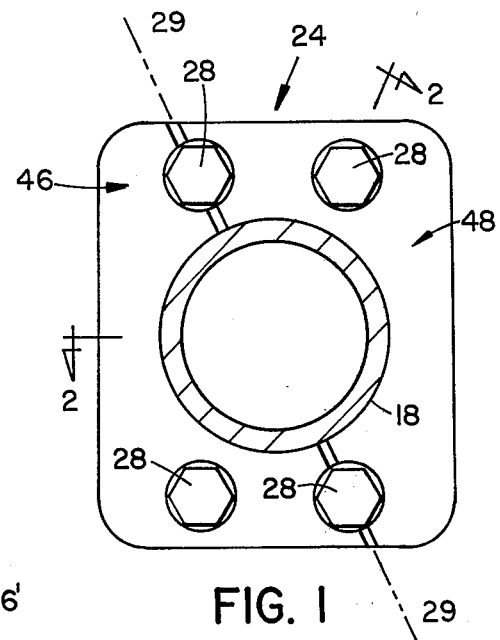
FIG. 1 is a plan view looking into the bulkhead of an assembled conduit and split flange retainer according to the invention.
Figure 3:
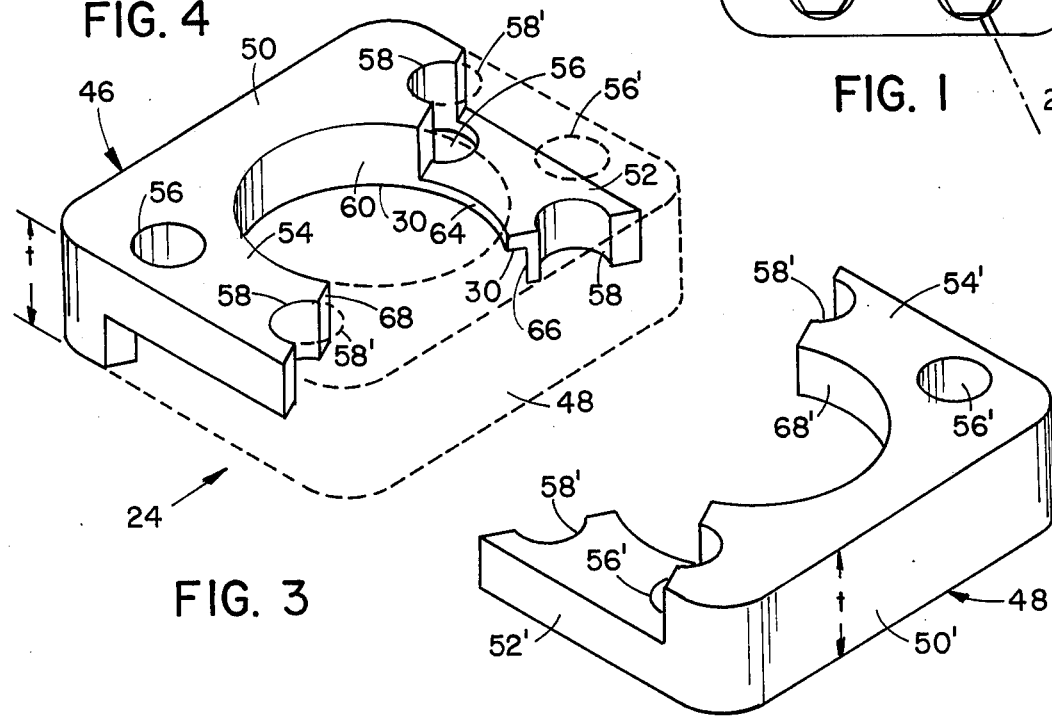
FIG. 3 illustrates in perspective a split flange retainer of the invention coupled together (in phantom) and pulled apart.

Referring first to the embodiment shown in FIGS. 1–3 of the drawings, the four-bolt split flange retainer claimp embodiment is shown for hydraulically coupling and placing in sealed fluid communication a hydraulic hose 10 with a bulkhead 12, which may be an integral part of a pump, valve, motor, cylinder, etc., having a standard port 14 and four tapped holes 16. The hose is coupled to the bulkhead through a rigid conduit member 18 of standard design (see reference SAE J518C) having a fitting 20 at one end for adaptively connecting to the hose, a flanged head 22 at the opposite end against which the split flange coupling 24 of the invention is biased and preferably an annular grooved seat for receiving sealing means such as O-ring 26. A liquid-tight seal to withstand working pressures, for example of 3,000 psi, 6,000 psi, or greater, is enabled as bolts 28 are engaged in holes 16 and tightened down against the split flange retainer 24. Shoulder 30 of the flange retainer presses against the flanged head 22 of the conduit which in turn transfers a sealing force to the O-ring 26 placing it in compression.

Hose 10 may be of conventional hydraulic design including a vulcanized unitary flexible body composed of an inner tube 32, an outer cover 34 and an interposed reinforcement 36. Standard heat-setting elastomeric or plastic materials may be used for the tube and cover. The reinforcement may be in the form of braided or spiral wire or textile material in one or more plies providing sufficient burst strength to accommodate the working pressures to be encountered. In conventional manner, the hose may be built by extruding the tube member 32, twining the reinforcement about the tube and then extruding a cover over the reinforced tube. The thus formed hose article, if uncured, may be subjected to a conventional curing or vulcanizing operation whereby a unitary composite article is formed.

Hose 10 is coupled to conduit 18 with the use of a standard fitting 20, which comrises a serrated stem 38, and a coaxially disposed compressible ferrule 40 also having a serrated inner surface. In conventional manner, the end of the hose is positioned between the annulus bound by the stem 38 and ferrule 40, and then the ferrule is crimped radially inwardly at spaced locations 42 to sandwich the hose end 44 in locking position between the serrated portions of the stem and ferrule.

While the assembly has been described illustrating a flexible hose coupled to a rigid metal conduit, it is also contemplated that the conduit 18 could itself be the flexible hose, which has a built-in self-sealing flanged head (corresponding to the flanged head portion 22) against which the flanged retainer assembly is biased.

In accordance with the invention, the unique split flanged retainer 24 is employed including a pair of flange halves 46, 48 which are shown as mating, interchangeable (hermaphroditic) halves, for reduced mold costs. Each flange half is generally comprised of an intermediate body portion 50, 50' of thickness $t$, a first leg 52, 52' of reduced thickness compared with the body, a second leg 54, 54' extending from the other end of the body portion, also of reduced thickness, and means for engaging fasteners (bolts 28) shown as a plurality of ports or holes 56, 56' and semi-ports 58, 58'.

Referring now to a single flange half, the same being true for the mating half which is indentical, the body portion of the flange half has a curvilinear inner surface defined by adjacent upper 60 and lower 62 (See FIG. 2) arcuate surfaces interconnected by shoulder 30, which is shown extending around to also form a portion of leg 52. The upper and lower arcuate surfaces are preferably concentric with the lower surface being defined by a greater radius.

Leg 52, which is of lesser thickness than body 50, is attached to and extends away from one end of the body portion, and has an inner arcuate surface 64, 66 which smoothly extends from the corresponding curvilinear inner surface 60, 62 of the body 50. In somewhat similar fashion, leg 54, which is also of lesser thickness than the body 50, extends from the other end of the body and has an inner arcuate surface 68, 68' which smoothly extends from upper arcuate surface 60 of the body portion.

An important feature of the invention is the overlap or interconnect feature between adjacent legs of flange half pairs. As shown in phantom in FIG. 3, when the flange half pairs are assembled leg 54 is superimposed upon leg 52', and leg 54' is superimposed upon leg 52. In the assembled position as shown in FIG. 2 and with the bolts 28 torqued down securely, it will be seen that the overlapping legs prevent tilting of the split flange coupling about any axis, and therefore excellent stability is provided even under maximum design working pressures. Without the tilting tendency, O-ring 26 remains seated and the chance for blowout is minimal.

In the preferred design shown in FIG. 3, it will also be seen that the total arc traversed by the curvilinear surface of the body portion taken together with the adjacent legs amounts to greater than 180°, and therefore the assembled flange has a built-in interlock capability. The only way to remove the flanges is to withdraw bolts 28 and then tilt the flange half 46 and 48 with respect to one another away from and about axis 29 through the split connection, shown in FIG. 1.

The flange retainer halves may be made out of any suitable material which will carry the designed load. The flange halves have suitably been formed of sintered powdered metals with very satisfactory dimensional tolerances being achieved. Alternatively, the flange halves may be milled or machined, forged or in certain instances cast from suitable metal materials.

It will be appreciated by those skilled in theart that a variety of modifications and variations can be made without departing from the scope of the invention as defined by the appended claims. For instance, while adjacent legs (e.g., 54, 52') of the assembled flange retainer halves have been shown to have equal thickness (i.e., one-half thickness $t$), this is only illustrative and such legs can have any relative thickness or thickness ratio provided the sum of their thicknesses is equal to the total thickness of the body portion when assembled.

As another alternative, while the invention has been disclosed with respect to the use of two flange halves, the invention in general is applicable to a plurality of interlocking mating flange portions, the totality of which completely traverses the circumference of the flanged head of the conduit to be mounted.

Similarly, while the flange half retainer of FIG. 3 is shown with one leg extending from the upper portion of the body and the opposite leg extending from the lower portion of the body, it is clear that both legs can extend from either the top or the bottom of the body.

Figure 4:
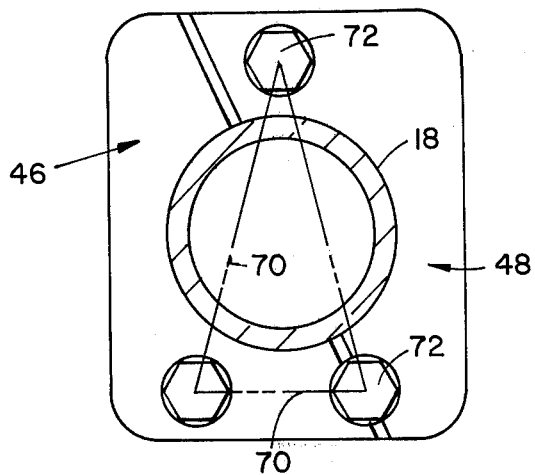
FIG. 4 is a plan view similar to FIG. 1 illustrating an alternative embodiment.

A further alternate embodiment is shown in FIG. 4. While the preferred embodiment describes a split flange retainer of the standard four-bolt type, in general there must be a minimum of three bolts to provide the necessary stability and to prevent tilting. The three-bolt embodiment is shown in FIG. 4 in which an effective stabilizing triangle 70 is formed between the three bolts 72. Alternatively, greater than four bolts may be employed particularly where large diameter conduit is involved.

What is claimed is:

1. A split flange retainer segment adapted to cooperatively engage the flanged head of a conduit for mounting the same, comprising:
    a body portion of a given thickness and having an inner surface defined by adjacent upper and lower surfaces interconnected by a stepped shoulder, the shoulder adapted to engage said flanged head of the conduit for mounting;
    a first leg, of lesser thickness than the body portion and attached to and extending away from one end of the body portion, having an inner surface extending from a portion of the inner surface of the body portion;
    a second leg, of lesser thickness than the body portion and attached to and extending away from the other end of the body portion, having an inner surface extending from a portion of the inner surface of the body portion;
    a plurality of openings in the split flange retainer segment for engaging fastener means facilitating mounting the flanged head of the conduit;
    at least one of said openings including a through bore and a semi-bore axially interconnected and formed at the juncture between the body portion and at least one of said legs; and
    at least one of said first and second legs extending substantially beyond the body portion from one of the openings and terminating, at its tip, at a juncture with another of the openings.

2. The split flange retainer of claim 1 wherein the inner surface of the body portion is curvilinear and the upper and lower surfaces are arcuate.

3. The split flange retainer of claim 1 wherein said first leg extends from one of said upper or lower surfaces of the body portion and said second leg extends from the other of said upper or lower surfaces.

4. The split flange retainer of claim 1 wherein said first and second legs both extend from one of said upper or lower surfaces of the body portion.

5. A split flange retainer assembly for making a fluid tight sealed connection to a bulkhead or the like, comprising:

a conduit of a given diameter and having a flanged head and seal means interposed between the head and bulkhead for enabling the sealed connection;

a pair of interconnecting flange segments having mating overlapping portions, said flange segments having inner arcuate surfaces with stepped shoulders and having an arc length greater than 180° and extending about the periphery of the conduit and the shoulder of the flange segments bearing against the flanged head of the conduit;

said inner arcuate surface of each of the flange segments terminating in respective first and second arc tips, the distance between the first and second arc tips being less than the diameter of the conduit;

each of said flange segments including four openings, two of the openings being full bores penetrating the flange segments and the other two openings being semi-bores positioned at each of said first and second arc tips;

means for fastening through the openings the interconnected segment to the bulkhead and forming the sealed connection; and said interconnecting flanged segments, in assembly with the conduit, being interlocked so that the flange segments cannot be pulled radially apart.

6. The assembly of claim 5 wherein the mating flange segments are defined by a body portion and two legs of lesser thickness than the body portion and extending from opposite ends of the body portion, the legs of one flange segment mating and overlapping with the legs of the other flange segment.

7. The assembly of claim 6 wherein said fastening means is comprised of four bolts penetrating cooperating holes in the flange segments, adapted and arranged such that each assembled bolt applied a force either directly or indirectly against each of the two flange segments.

8. A split flange retainer half for use in engaging the flanged head of a conduit having a given diameter, for coupling the same, comprising:

a body portion of a given thickness and having an inner curvilinear surface defined by adjacent upper and lower circular arcuate surfaces joined by a stepped shoulder, the shoulder adapted to engage the flanged head of the conduit;

first and second legs, of lesser thickness than the body portion and attached to and extending away respectively from each end of the body portion, each leg having an inner circular arcuate surface smoothly and continuously extending from at least one of said upper and lower arcuate surfaces of the body portion along the same circular arc defining said upper and lower arcuate surfaces;

said body portion together with the marginally extending first and second legs together having a curvilinear inner circular arcuate surface characterized by an arc length greater than 180°;

a plurality of openings in the split flange retainer half for receiving fastener means for coupling the flanged head of the conduit; and at least one of said openings including a through bore and a semi-bore axially interconnected and formed at the juncture between the body portion and at least one of said legs.

9. The split flange retainer half of claim 8 wherein the inner circular arcuate surfaces of the first and second legs terminate in respective first and second arc tips, the distance between the first and second arc tips being less than the diameter of the conduit.

* * * * *